(12) United States Patent
Renke et al.

(10) Patent No.: US 11,403,092 B2
(45) Date of Patent: Aug. 2, 2022

(54) SYSTEM COMPLIANCE BASED ON A MIX OF HOTPATCHES AND COLDPATCHES

(71) Applicant: Microsoft Technology Licensing, LLC, Redmond, WA (US)

(72) Inventors: Maxwell Christopher Renke, Sammamish, WA (US); Benjamin M. Schultz, Bellevue, WA (US); Yevgeniy Bak, Redmond, WA (US); Vijaykumar Sharma, Redmond, WA (US); Apurva Ashvinkumar Thanky, Redmond, WA (US); Hari R. Pulapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/925,169

(22) Filed: Jul. 9, 2020

(65) Prior Publication Data
US 2022/0012044 A1 Jan. 13, 2022

(51) Int. Cl.
G06F 8/656 (2018.01)
G06F 8/61 (2018.01)
G06F 21/53 (2013.01)
G06F 21/57 (2013.01)
G06F 21/64 (2013.01)

(52) U.S. Cl.
CPC ............ *G06F 8/656* (2018.02); *G06F 8/63* (2013.01); *G06F 21/53* (2013.01); *G06F 21/577* (2013.01); *G06F 21/64* (2013.01)

(58) Field of Classification Search
None
See application file for complete search history.

(56) References Cited

U.S. PATENT DOCUMENTS 9,697,019 B1 * 7/2017 Fitzgerald ............... H04L 41/08
10,474,813 B1 * 11/2019 Ismael .................. G06F 21/566
(Continued)

OTHER PUBLICATIONS

H. Foster, G. Spanoudakis and K. Mahbub, "Formal Certification and Compliance for Run-Time Service Environments," 2012 IEEE Ninth International Conference on Services Computing, 2012, pp. 17-24, doi: 10.1109/SCC.2012.23. (Year: 2012).*

(Continued)

*Primary Examiner* — Andrew M. Lyons
(74) *Attorney, Agent, or Firm* — Workman Nydegger (57) ABSTRACT

Enacting a compliance action using an assessment that considers a mix of coldpatches and hotpatches includes identifying a policy defining the compliance condition based on patching status of a software component. A patching state of the software component is determined, including identifying evidence of coldpatched binary file(s) and hotpatch binary file(s) applicable to the software component, and using the evidence to determine whether or not the hotpatch binary file(s) have been applied to a memory image into which an instance of the software component is loaded. Based on the policy and on the patching state of the software component, a compliance action is enacted for the compliance condition. The compliance action includes generating a health report or a health attestation, initiating a patching action, initiating an execution control action, and the like.

20 Claims, 4 Drawing Sheets

(56) References Cited

U.S. PATENT DOCUMENTS

| | | | | |
|---|---|---|---|---|
| 2004/0107416 | A1* | 6/2004 | Buban | G06F 8/656 |
| | | | | 717/170 |
| 2006/0080656 | A1* | 4/2006 | Cain | G06F 8/65 |
| | | | | 717/174 |
| 2006/0122937 | A1* | 6/2006 | Gatto | H04L 9/3263 |
| | | | | 705/51 |
| 2007/0169171 | A1* | 7/2007 | Kumar | H04L 63/105 |
| | | | | 726/2 |
| 2013/0081103 | A1* | 3/2013 | Uner | G06F 21/56 |
| | | | | 726/1 |
| 2013/0263104 | A1 | 10/2013 | Basel et al. | |
| 2014/0007067 | A1* | 1/2014 | Nelson | G06F 8/654 |
| | | | | 717/168 |
| 2016/0142842 | A1* | 5/2016 | Nishikori | H04R 29/007 |
| | | | | 381/81 |
| 2016/0147518 | A1* | 5/2016 | Dimitrakos | G06F 8/60 |
| | | | | 717/120 |
| 2016/0373481 | A1* | 12/2016 | Sultan | G06F 21/554 |
| 2017/0187582 | A1* | 6/2017 | Ko | H04L 43/08 |
| 2017/0242687 | A1* | 8/2017 | Saraswati | G06F 8/656 |
| 2018/0004937 | A1* | 1/2018 | Shannon | H04L 9/0891 |
| 2018/0075241 | A1* | 3/2018 | Gomez | G06F 8/654 |
| 2018/0095993 | A1* | 4/2018 | Clark | G06F 16/137 |
| 2018/0232517 | A1* | 8/2018 | Roth | H04L 63/10 |
| 2019/0138725 | A1* | 5/2019 | Gupta | G06F 21/54 |
| 2019/0155598 | A1* | 5/2019 | Bainville | G06F 8/71 |
| 2019/0370471 | A1* | 12/2019 | Petratos | G06F 8/65 |
| 2020/0167474 | A1* | 5/2020 | Goldman | H04L 9/3247 |
| 2020/0178072 | A1* | 6/2020 | Hammond | H04W 12/50 |
| 2020/0192658 | A1* | 6/2020 | Doebel | G06F 8/656 |
| 2021/0133326 | A1* | 5/2021 | Wu | G06F 21/572 |

OTHER PUBLICATIONS

D. Kienzle, R. Persaud and M. Elder, "Endpoint Configuration Compliance Monitoring via Virtual Machine Introspection," 2010 43rd Hawaii International Conference on System Sciences, 2010, pp. 1-10, doi: 10.1109/HICSS.2010.182. (Year: 2010).*

M. Payer and T. R. Gross, "Hot-patching a web server: A case study of ASAP code repair," 2013 Eleventh Annual Conference on Privacy, Security and Trust, 2013, pp. 143-150, doi: 10.1109/PST. 2013.6596048. (Year: 2013).*

"International Search Report and Written Opinion issued in PCT Application No. PCT/US21/029034", dated Jul. 21, 2021, 14 Pages.

* cited by examiner

SYSTEM COMPLIANCE BASED ON A MIX OF HOTPATCHES AND COLDPATCHES

BACKGROUND

Computer software is complex and can be difficult to write. As such, it is nearly inevitable that bugs, including security vulnerabilities, crashes, and other undesired behaviors, are discovered in shipped software applications. When bugs are discovered, developers undertake to produce fixes or "patches" for the bug, and make those software patches available to users. Additionally, developers may occasionally introduce new features or other improvements by way of software patches. Accordingly, developers, administrators, and security professionals often modify existing systems to achieve new or improved operation via installation of software patches.

Classically, software patching was accomplished via "coldpatches." In some implementations of coldpatching, an original binary image (e.g., a version 1.0 binary) is modified on-disk to include new/replacement code of one or more software patches, resulting in a coldpatched binary (e.g., a version 1.1. binary). In other implementations the original binary image is replaced on-disk by the coldpatched binary. Whether on-disk binary modification or replacement is used, any software component(s) that operated from the original binary are restarted to utilize the new/replacement code within the coldpatched binary. If these software component(s) include lower-level operating system (OS) components, such as an OS kernel, restarting the software component(s) often requires an OS reboot. Whether or not an OS reboot is required, software component restarts lead to system downtime and/or service disruption.

More recently, techniques have been developed to accomplish software patching via "hotpatches." Some hotpatch implementations directly modify an in-memory image of a software component to include the new/replacement code of one or more patches. In these implementations, the code of a hotpatch binary is applied in-memory to an already-loaded executing binary (which has previously been loaded from, for example, an original binary or a coldpatched binary). These implementations can therefore apply patches to software components without requiring a restart of those software components. Other hotpatch implementations patch a binary during a loader phase so that a newly-launched software component includes one or more hotpatch(es). In these implementations, the code of a hotpatch binary is applied by an OS loader to "fix up" an original binary or a coldpatched binary when launching a software component from the original binary or coldpatched binary.

BRIEF SUMMARY

When systems support both coldpatching and hotpatching, those systems can exist in various states of patching—including executing software components that are loaded from various combinations of coldpatched binaries and hot patches. Thus, these systems can be in varying states of security, compliance, and operation. At least some embodiments described herein are directed to evaluating and enforcing system compliance based on a mix of coldpatches and hotpatches that are available and/or active at a computer system. For example, embodiments may include leveraging one or more policies to determine compliance conditions for one or more software components, determining health state for these more software component(s) based at least on which coldpatches and which hotpatches are applied to running instances of these software component(s), and enacting one or more compliance actions for the compliance conditions, such as generating a health report and/or health attestation for these software component(s), initiating patching action for these software component(s), initiating an execution control action for these software component(s), and the like.

Embodiments are directed to methods, systems, and computer program products for enacting compliance actions using an assessment that considers a mix of coldpatches and hotpatches. These embodiments include identifying one or more system policies that define one or more compliance conditions based on patching status of software components, including identifying a particular system policy that defines a particular compliance condition for a particular software component. These embodiments also include determining a patching state of the particular software component. Determining the patching state includes identifying a plurality of evidence, each corresponding to a binary file of a plurality of binary files that has been applied to the particular software component, the plurality of binary files including (i) one or more coldpatched binary files from which the particular software component is loadable, and (ii) one or more hotpatch binary files applicable to the particular software component. Determining the patching state also includes determining, based on the plurality of evidence, whether or not at least a subset of the one or more hotpatch binary files has been applied to a memory image into which an instance of the particular software component is loaded within system memory at the computer system. These embodiments also include, based on the particular system policy, and based on the determined patching state of the particular software component, enacting a compliance action for the particular compliance condition. The compliance action includes at least one of generating at least one of a health report or a health attestation, based at least on the patching state of the particular software component; initiating a patching action on the particular software component; or initiating an execution control action on the particular software component.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments described herein are directed to evaluating and enforcing system compliance based on a mix of coldpatches and hotpatches that are available and/or active at a computer system. For example, embodiments may include leveraging one or more policies to determine compliance conditions for one or more software components, determining health state for these more software component(s) based at least on which coldpatches and which hotpatches are applied to running instances of these software component(s), and enacting one or more compliance actions for the compliance conditions, such as generating a health report and/or health attestation for these software component(s), initiating patching action for these software component(s), initiating an execution control action for these software component(s), and the like.

Figure 1A:
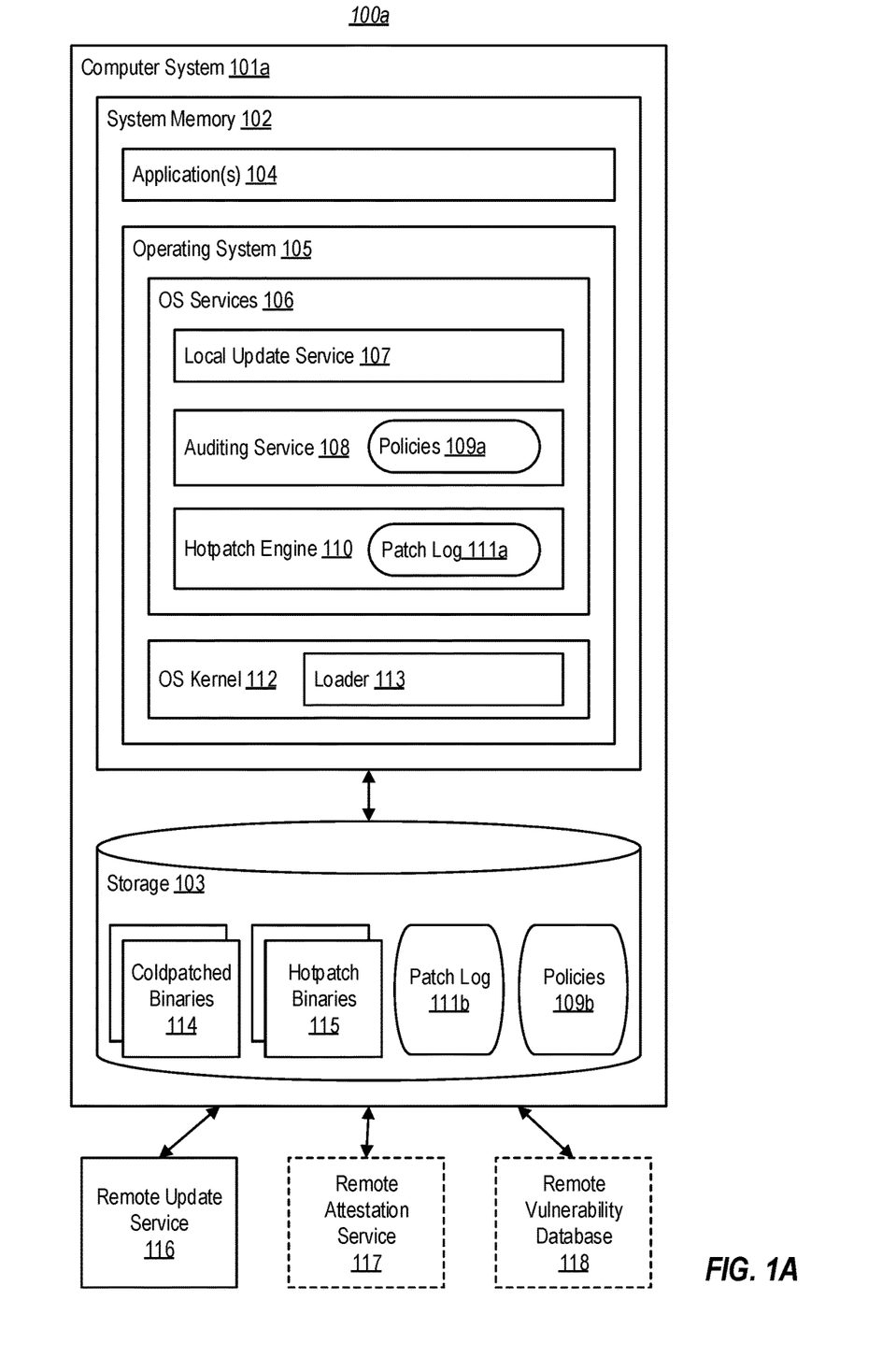
FIG. 1A illustrates an example computer architecture that facilitates evaluating and enforcing system compliance based on a mix of hotpatches and coldpatches.
Figure 1B:
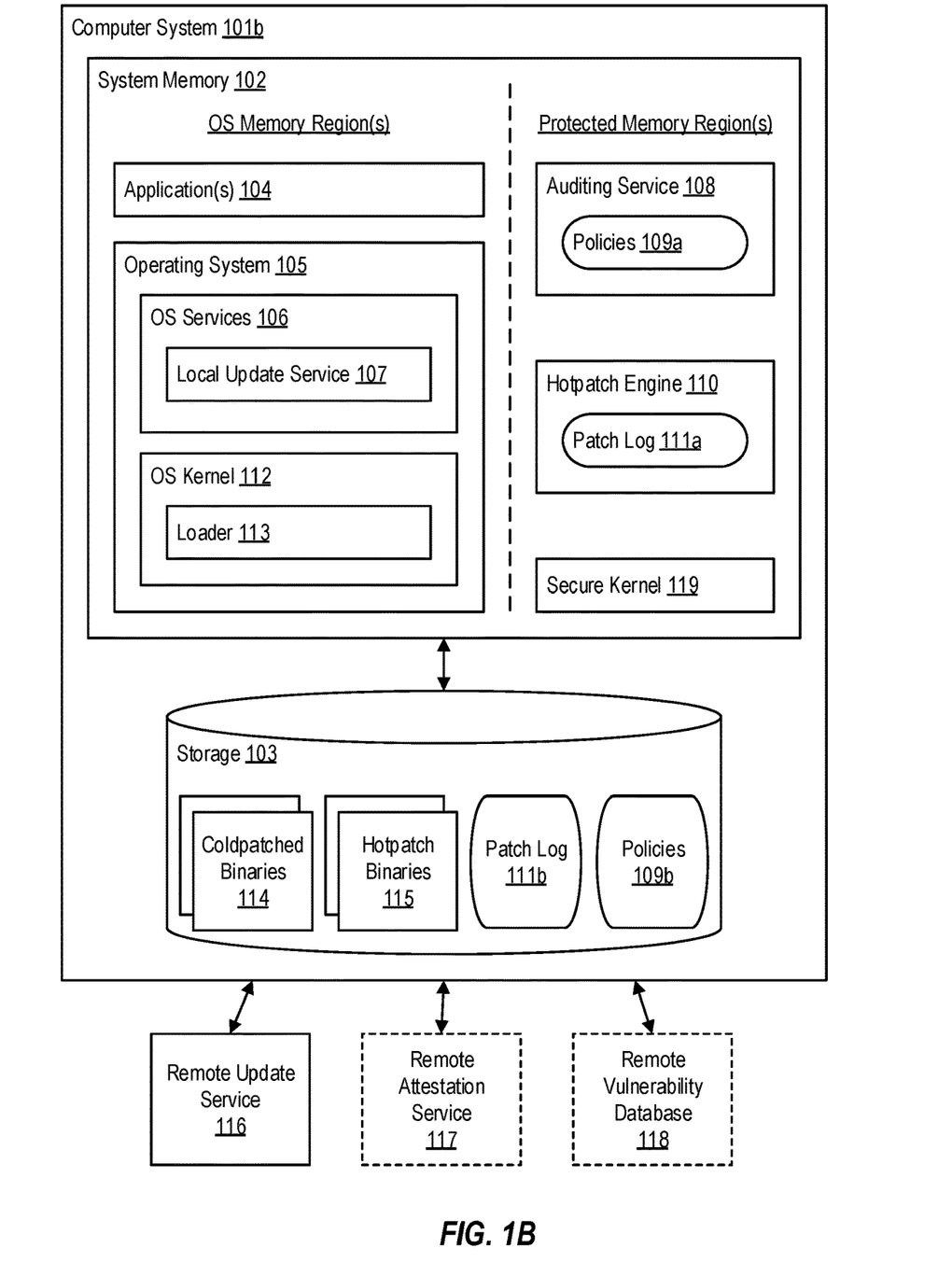
FIG. 1B illustrates an example computer architecture that facilitates evaluating and enforcing system compliance based on a mix of hotpatches and coldpatches, in which memory is partitioned into OS memory region(s) and protected memory region(s)

FIGS. 1A and 1B illustrate example computer architectures 100a/100b that facilitate evaluating and enforcing system compliance based on a mix of hotpatches and coldpatches. As shown, each of computer architectures 100a/100b includes a corresponding computer system 101a/101b. Each computer system 101a/101b, in turn, comprises computer hardware, such as one or more processors (not shown), system memory 102, and storage 103 (e.g., durable storage, such as magnetic drive, a solid-state drive, etc.). System memory 102 stores runtime binary images of OS services 106 and an OS kernel 112 of an OS 105, as well as a binary image of an application 104 (or a plurality of binary images of a plurality of applications) executing within the context of the OS 105.

In computer system 100a of FIG. 1A the system memory 102 is shown as including a single memory partition, while in computer system 100b of FIG. 1B the system memory 102 is shown as being partitioned into at least one OS memory region and at least one protected memory region. In embodiments, computer system 100b operates virtualization technology, such as a hypervisor, which enforces these memory partitions in computer system 100b. In computer system 100b, the protected memory region is managed by a secure kernel 119 and includes some services, such as the depicted auditing service 108 and hotpatch engine 110 (which are part of OS services 106 in computer system 100a). As will be appreciated by one of ordinary skill in the art, placing the auditing service 108 and the hotpatch engine 110 within the protected memory region isolates those services from application 104 and OS 105, helping to secure them against tampering by application 104 and OS 105. In hybrid embodiments, the auditing service 108 and/or the hotpatch engine 110 include sub-components within each of the OS memory region and the protected memory region.

Regardless of whether or not system memory 102 is partitioned, the various software components illustrated within system memory 102 execute based on one or more of coldpatched binaries 114 (which, in the example, can include original unpatched binaries) stored within storage 103. In embodiments, one or more of these software components further execute based on one or more of hotpatch binaries 115, which are applied, in-memory, to memory images that are loaded from the coldpatched binaries 114. In one example, during initialization of a software component, a hotpatch engine 110 directs a loader 113 to "fix up" one or more of the coldpatched binaries 114 with code of one or more of the hotpatch binaries 115, such that a resulting in-memory binary image for that software component that includes one or more hotpatches. In another example, after initialization of a software component, the hotpatch engine 110 modifies an existing in-memory binary image with code of one or more of the hotpatch binaries 115, resulting in that in-memory binary image for that software component that includes one or more hotpatches.

In embodiments, computer systems 100a/100b include a local update service 107, and communicate with a remote update service 116 (or a plurality of remote update services). In embodiments, the local update service 107 communicates with the remote update service 116 (e.g., via one or more networks) to receive the coldpatched binaries 114 and/or the hotpatch binaries 115. In embodiments, the local update service 107 also applies new coldpatches to one or more existing versions of coldpatched binaries 114, and initiate the application of hotpatch binaries 115 (e.g., via the hotpatch engine 110).

As illustrated, the hotpatch engine 110 (and potentially the loader 113) maintains a patch log 111, which are shown as existing within system memory 102 as patch log 111a and/or within storage 103 as patch log 111b. While the patch log 111 can store a great variety of information in various embodiments, in some embodiments, for one or more executing software components (e.g., application 104, OS services 106, OS kernel 112, etc.), the patch log 111 logs at least a record of each time a hotpatch is applied to a coldpatch, and/or each time a hotpatch is applied to another hotpatch. Thus, the patch log 111 can be used to validate, for each of one or more executing software components, a chain of coldpatches and/or hotpatches from which the software component executes. In embodiments, one or more of the coldpatched binaries 114 and/or the hotpatch binaries 115 is associated with a corresponding digital signature. In these embodiments, these digital signatures are checked by the local update service 107 and/or the hotpatch engine 110, and those checks are recorded in the patch log 111. In embodiments, the patch log 111 is protected by one or more tamper-preventative technologies (e.g., encryption, memory partitioning, digital signatures, keys or hashes stored in a secure cryptoprocessor, etc.). In some embodiments, patch log 111 is stored in a remote location such as a fileshare; alternatively, or additionally, patch log 111 may be implemented as a part of a distributed patch log database that may track a plurality of computer systems. As will be appreciated by one of ordinary skill in the art, the information stored within the patch log 111 forms an "audit trail" of the patches that have been installed.

In some embodiments, the loader 113 loads a hotpatch from hotpatch binaries 115, and the hotpatch engine 110 applies the hotpatch to one or more memory images within system memory 102. The hotpatch engine 110 records a record of the hotpatch application in the patch log 111.

In some embodiments, the loader 113 loads a hotpatch from hotpatch binaries 115, and the hotpatch engine 110 validates a digital signature of the hotpatch. If the signature is valid, then the hotpatch engine 110 applies the hotpatch to one or more memory images within system memory 102. The hotpatch engine 110 records a record of the hotpatch application and the signature in the patch log 111. In some scenarios, new hotpatch binaries 115 will be available, and these new hotpatch binaries 115 will overlap or supersede an existing hotpatch binaries 115. In some embodiments, assuming the new hotpatch binaries 115 are validated, loader 113 and hotpatch engine 110 will unload the existing hotpatch binaries 115 and load the new hotpatch binaries 115. In some embodiments, loader 113 and hotpatch engine 110 will load new hotpatch binaries 115 after existing hotpatch binaries 115. In some scenarios, computer system 101a/101b reboots and there are more than one hotpatch binaries 115 available for the same component. In some embodiments, the loader 113 and hotpatch engine 110 ensure that loading of coldpatched binaries 114 and hotpatch binaries 115 is, itself, tamper-preventative. In some embodiments, the loader 113 and hotpatch engine 110 ensure that loading of coldpatched binaries 114 and hotpatch binaries 115 includes non-optional patch logging into patch log 111. In some embodiments, the loader 113 and hotpatch engine 110 ensure hotpatches are loaded in order (e.g. build date, time received, signature date, etc.), and logs the order in which the hotpatches were applied in the patch log 111. In some embodiments, the loader 113 and/or hotpatch engine 110 will check policies 109 and load the hotpatch binaries 115 instances according to policy. In some embodiments computer system 101a/101b may not have cold patches, or based on policy, may not allow cold patches for certain time windows or environmental factors. This may be the result of availability requirements, it may be the result of constrained bandwidth (hotpatch binaries are much smaller than coldpatch binaries), or other factors.

The auditing service 108 analyzes the computer system 101a/101b to determine if the computer system 101a/101b meets one or more compliance conditions within policies 109, which are shown as existing within system memory 102 as policies 109a and/or within storage 103 as policies 109b, and to potentially enforce one or more compliance conditions that are not met. In embodiments, compliance means the computer system 101a/101b is operating a given set of software patches per condition(s) defined in the policies 109. In some embodiments, compliance also means that the application 104 and/or the OS 105 is in a given configuration per condition(s) defined in the policies 109. In embodiments, policies 109 are received from the remote update service 116, though they could be obtained from one or more other sources, they could be user-defined, etc. In some embodiments, the policies 109 are implicitly received or encoded in the patches. This may be implemented as associated metadata with an individual patch, as metadata with a set of patches, as encoded data within the patch, as encoded data distributed across a set of patches, etc. In some embodiments, policies 109 and patch log 111 are implemented as the same component.

In embodiments, the auditing service 108 inspects the coldpatched binaries 114 and/or the hotpatch binaries 115, in combination with the patch log 111, to determine at least one compliance state of the computer system 101b/101b. In some embodiments, the auditing service 108 further analyzes the system memory 102 to consider whether one or more of the hotpatch binaries 115 are actually loaded into the system memory 102. Examples of analysis of system memory 102 include calling certain application programming interfaces (APIs), or producing appropriate input to various presumably patched components in order to differentiate between compliance and non-compliance and/or to identify whether a hotpatch was applied. In some embodiments, the auditing service 108 also considers other system configuration information, such, file system, registry, and other storage artifacts. In some embodiments, the auditing service 108 also considers additional information such as local security settings, firewall settings, and other risk factors (e.g. user profiles, location, application reputation, etc.).

Using this information, the auditing service 108 determines a health state of one or more components of the computer system 101b/101b. Then, the auditing service 108 performs one or more compliance actions, such as generating a health report and/or health attestation, initiating patching action (e.g., applying a coldpatch and/or a coldpatch, downloading and queueing available updates, etc.), or initiating an execution control action (e.g., terminating an instance of a software component, permitting new instances of the software component and/or dependent component to be launched, sandboxing a software component, etc.).

For example, in embodiments, a software patch that addresses for a given vulnerability (e.g., identified in a remote vulnerability database 118) may be available as one or both of a coldpatch or hotpatch. In some embodiments, if a vulnerability is addressed by both a coldpatch and hotpatch, and each of the coldpatch and the hotpatch address the vulnerability in the same way. In these embodiments, the auditing service 108 may determine whether one of the coldpatch or the hotpatch is applied to running software component(s), and perform one or more compliance actions based on the determination. In other embodiments, where a vulnerability is addressed by both a coldpatch and hotpatch, the coldpatch and the hotpatch address the vulnerability different ways. For example, due to technical limitations, it may be impractical for hotpatches and coldpatches to be implemented with the equivalent level of security. Thus, for instance, a hotpatch may provide a mitigation, while a coldpatch provides a fix. As an example, if a network packet type can be used to attack a system, a hotpatch may address the vulnerability by dropping packets of that type, while a coldpatch may address the vulnerability with additional packet processing that ensures that packets of that type are not allowed to implement the attack. In these embodiments, the auditing service 108 may determine a compliance state that differs based on whether the mitigation hotpatch or the coldpatch with the fix was applied. The auditing service 108 may determine which of the mitigation hotpatch or the coldpatch with the fix is applied to running software component(s), and perform one or more compliance actions based on these determinations.

Thus, in embodiments, the auditing service 108 ensures that an appropriate combination of the coldpatched binaries 114 and the hotpatch binaries 115 are installed and applied to running software component in order to provide a runtime security compliance guarantee, and may impose restrictions on the software component if the runtime security compliance guarantee cannot be met. In some embodiments, the auditing service 108 enforces that some hotpatches be applied before other software components are loaded at computer systems 100a/100b. In some embodiments, using an analysis of the coldpatched binaries 114, the auditing service 108 also enforces that these hotpatches remain applied for the lifetime of a software component—even across system reboot or service interruption—thereby providing "reset/reboot" security compliance guarantees.

Figure 1C:
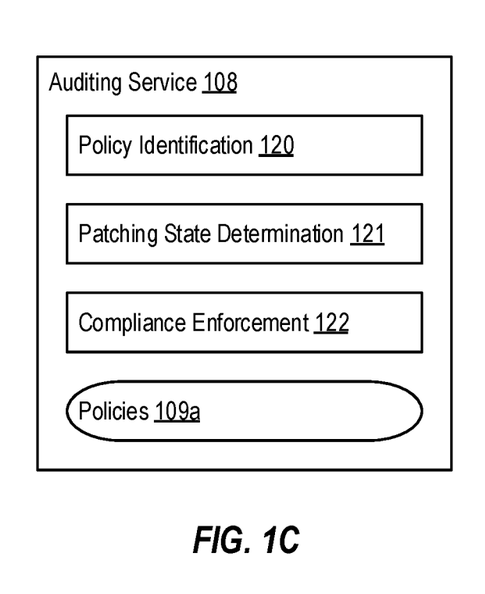
FIG. 1C illustrates further detail of an example auditing service shown in FIGS. 1A and 1B.

To demonstrate how the auditing service 108 might accomplish the foregoing, FIG. 1C illustrates additional detail of the auditing service 108 of FIGS. 1A and 1B. The auditing service 108 depicted in FIG. 1C includes a variety of components (i.e., policy identification component 120, patch state determination component 121, and compliance enforcement component 122) that represent various functions that the auditing service 108 might implement in accordance with various embodiments described herein. It will be appreciated that the depicted components—including their identity, sub-components, and arrangement—are presented merely as an aid in describing various embodiments of auditing service 108 described herein, and that these components are non-limiting to how software and/or hardware might implement various embodiments of the auditing service 108 described herein, or of the particular functionality thereof.

In general, the policy identification component 120 accesses policies 109 from storage 103 and/or from an external source (e.g., remote update service 116). From these policies 109, the policy identification component 120 identifies one or more compliance conditions based on the patching status of one or more software components executing at computer system 101a/101b. In some embodiments, the policy identification component 120 also identifies one or more vulnerabilities from the remote vulnerability database 118. In these embodiments, the identified vulnerabilities are used as further input to the conditions within the policies 109.

In general, the patch state determination component 121 considers both coldpatch state and hotpatch state to determine a patching state for at least one software component. In embodiments, the patch state determination component 121 determines the coldpatched binaries 114 and the hotpatch binaries 115 that exist within storage 103, and which of these hotpatch binaries 115 have been applied to one or more running instances of software components. In embodiments, the patch state determination component 121 analyzes which of hotpatch binaries 115 have been applied to one or more running instances of software components based on consulting the patch log 111, and/or by analyzing those instances within system memory 102 directly.

In general, based on the analysis by the patch state determination component 121, the compliance enforcement component 122 enacts one or more compliance actions for the compliance conditions identified by the policy identification component 120. In embodiments, compliance actions can include generating a health report and/or health attestation, initiating patching action, initiating an execution control action, and the like.

Figure 2:
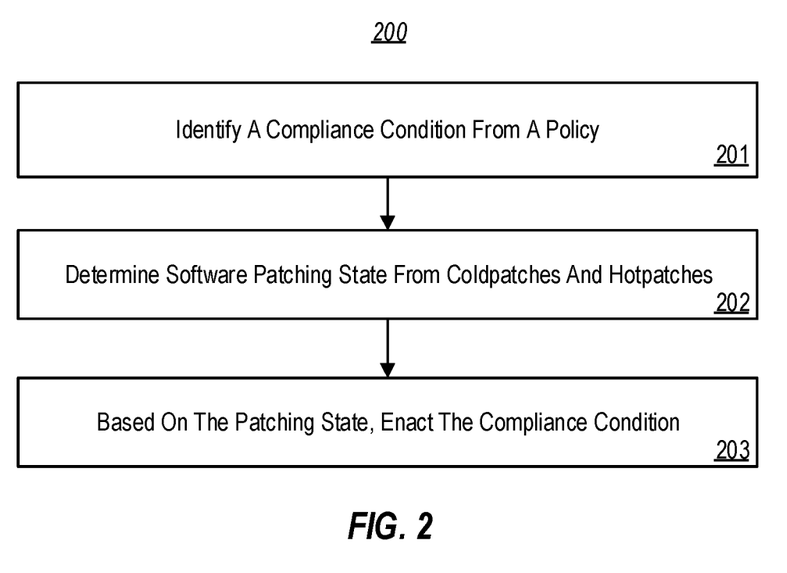
FIG. 2 illustrates a flow chart of an example method for enacting compliance actions using an assessment that considers a mix of coldpatches and hotpatches.

A further description of these components of the auditing service 108 are now provided in connection with FIG. 2, which illustrates a flow chart of an example method 200 for enacting compliance actions using an assessment that considers a mix of coldpatches and hotpatches. Method 200 will be described with respect to the further components and data of computer architectures 100a/100b.

Method 200 comprises an act 201 of identifying a compliance condition from a policy. In embodiments, act 201 includes identifying one or more system policies that define one or more compliance conditions based on patching status of software components, including identifying a particular system policy that defines a particular compliance condition for a particular software component. In an ongoing example, the policy identification component 120 loads one or more policies from policies 109. These policies 109 provide compliance conditions on software components executing at computer system 101a/101b, such as application 104, OS services 106, OS kernel 112, etc. For purposes of the ongoing example it is supposed that the policies 109 define at least one compliance condition for application 104.

In one policy example, the policies 109 define a set of conditions such that, if a given set of hotpatches are available (either within hotpatch binaries 115 or from the remote update service 116) to address a vulnerability (e.g., identified in the remote vulnerability database 118), these hotpatch(es) must be applied for the computer system 101a/101b to maintain compliance (and software component may be terminated if compliance is not met). In some embodiments, the policies 109 also define a condition that the coldpatched binaries 114 be updated (e.g., via the local update service 107) to address the vulnerability (at which point the hotpatches will no longer be applicable to those coldpatched binaries). In embodiments, a hotpatch is not applicable to a coldpatched binary because the coldpatched binary already includes a fix provided by the hotpatch, or the coldpatched binary includes a conflicting patch (e.g., a fix in the coldpatched binary that conflicts with a mitigation that was in the hotpatch). In some embodiments, the policies 109 define a condition based on reliability. In one example reliability policy, if both hotpatch and cold patch updates are available, and if application of a hotpatch update fails, the policy enforces application of coldpatch instead (or vice versa).

In another policy example, the policies 109 define a set of conditions such that a software component operating in within an operating environment can only be deemed compliant if the operating environment is in a known compliance state. In embodiments, an operating environment is considered to be in a known compliance state if it meets certain secure boot requirements and/or if there is an appropriate digital signature audit trail within the patch log 111. In some embodiments, if a threshold amount of time has passed, and/or if there have been a threshold number of hotpatches applied to the operating environment, the policies 109 require that the operating environment be "re-baselined" prior to the software component being deemed compliant. In embodiments, the operating environment is re-baselined via installation of coldpatches, via analysis of an audit trail, etc.

In another policy example, the policies 109 define a set of conditions that direct whether or not a system can maintain compliance based on whether there is a security goal or an availability goal for the system. In embodiments, with a goal of security, the policies 109 direct that if a coldpatch is available that is more secure than an available hotpatch, then the coldpatch must be installed to maintain compliance (even if this means disruption of a service or even a system reboot). In embodiments, with a goal of availability, the policies 109 direct that if a hotpatch is available it should be applied in preference to a coldpatch (which is not applied until a later re-baseline/reboot). In embodiments, with a goal of balancing security and availability, the policies 109 direct that a hotpatch that implements a mitigation should be applied in preference to a coldpatch that implements a fix.

In another policy example, the policies 109 define a set of conditions that direct whether or not a system can maintain compliance based on an attribute of computer system 101a/101b. In embodiments, this includes one or more of location, user information, the presence of a peripheral, application information, or other attributes. Some locations, for example, may have constrained bandwidth and/or other environmental factors which limit downloading and applying one or more coldpatches. In another example, multiple hotpatch binaries 115 may exist for a certain component. Based on policy 109 and an attribute of computer system 101a/101b, loader 113 and hotpatch engine 110 will load one (or a group of) hotpatch binaries 115, other hotpatch binaries 115 may be loaded prior to (e.g. in a certain order) or not loaded. In embodiments, the policies 109 define a set of conditions based on one or more of a health attribute or a functionality attribute. For example, one or more of policies 109 may define a set of hotpatches required for a system to be certified as healthy, while one or more others of policies 109 may define a set of hotpatches required for a system to be certified as having needed functionality. In some embodiments, one or more of policies 109 may even define a set of hotpatches that remove functionality. For example, if there is a software component that provides functionality for which there is an unpatched or unpatchable vulnerability, policies 109 may require that a hotpatch be applied which removes the functionality from the software component (thereby removing the vulnerability).

In another policy example, the policies 109 define a set of conditions that consider the workloads of various software components and/or dependencies. For example, due to their differing workloads the policies 109 may permit a virtual machine with an uptime priority (e.g., running client services) to maintain compliance with hotpatches in situations in which a virtual machine with a security priority (e.g., running server workloads) would require coldpatches to maintain compliance. In another example, the policies 109 may permit a software component having a threshold number of dependencies to maintain compliance with hotpatches in situations in a software component having a fewer number of dependencies would require coldpatches to maintain compliance. In another example, the policies 109 may permit a software component having no redundancy to maintain compliance with hotpatches in situations in a software component having redundancy (e.g., via clustering) would require coldpatches to maintain compliance.

In another policy example, the policies 109 define a set of conditions that direct that a set of hotpatches that implement a mitigation are sufficient to maintain compliance, but that coldpatches that implement a fix should be opportunistically downloaded and queued for installation at the next opportunity (e.g., during scheduled maintenance).

In another policy example, the policies 109 define a set of conditions that consider a service level agreement (SLA) associated with a software component. For example, the policies 109 may permit compliance using hotpatches for a software component associated with a more restrictive SLA, but require application of coldpatches for a software component associated with a less restrictive SLA. As an example, the condition may specify that a set of hotpatches suffice for a given compliance state if and only if the SLA exceeds "three nines" (99.9% availability), or may specify that a set of coldpatches are required for a given compliance state if the SLA is below 95%. Note that in some embodiments, if the hotpatch or coldpatch is determined to be out of SLA, future hotpatch binaries and coldpatched binaries may not be installed until a user or administrator takes action. In some embodiments, if a hotpatch is out of SLA, it is unloaded in favor of higher reliability. In some embodiments, if a coldpatch is out of SLA, a rollback procedure may be initialized, in which the appropriate coldpatched binaries 114 are uninstalled, after which the process(es) running that coldpatch may be restarted.

In another policy example, the policies 109 define a set of conditions that define when a mitigation hotpatch is no longer sufficient. The set of conditions may indicate that a fix coldpatch is needed to maintain compliance, or may indicate that an updated policy (e.g., extending the set of conditions to a later date) must be downloaded to determine a compliance state that is based on the hotpatch. As an example, the condition may specify that a set of hotpatches suffice until a predetermined date or time, for a minimum number of hours, or that the compliance state must have a shorter validity period if the condition applies.

In another policy example, the policies 109 define one or more a set of conditions that define an order in which two or more hotpatches must be applied. As an example, a condition may specify that a computer system 101a/101b, or a software component executing therein, can meet a health condition sufficient for attestation if the patch log 111 indicates that two or more hotpatches must have been applied in a particular order.

As mentioned, in embodiments the policies 108 are implicitly received or encoded in the patches. Thus, in embodiments, at least one of the one or more system policies is received or encoded within a patch file.

Method 200 also comprises an act 202 of determining software patching state from coldpatches and hotpatches. In embodiments, act 201 includes determining a patching state of the particular software component. In embodiments, determining the patching state includes identifying a plurality of evidence, each corresponding to a binary file of a plurality of binary files that has been applied to the particular software component, the plurality of binary files including (i) one or more coldpatched binary files from which the particular software component is loadable, and (ii) one or more hotpatch binary files applicable to the particular software component. In embodiments, each of the plurality of evidence is usable determining if a plurality of binary files has been applied to the particular software component. For example, evidence can include cryptographic hashes of in-memory or on-disk copies of the patch files, the patch log 111, etc. Continuing the ongoing example, in one scenario the patch state determination component 121 determines one or more coldpatches within the coldpatched binaries 114 that are applicable to application 104, and one or more hotpatches within the hotpatch binaries 115 that are applicable to application 104.

In some embodiments, one or more of the coldpatched binaries 114 and/or the hotpatch binaries 115 are associated with a digital signature. Thus, in some embodiments of act 202, each of the one or more coldpatched binary files and the one or more hotpatch binary files are associated with a corresponding digital signature. In these embodiments, the patch state determination component 121 determines the validity of these signatures, such as by checking these signatures against a digital certificate.

In some embodiments, determining the patching state is measured on a per-process basis. In one scenario, the computer system 101a/101b was booted without new coldpatched binaries 114 applied, however new coldpatched binaries 114 are available, including for application 104. A first instance of application 104 is loaded and is running, and loader 113 and hotpatch engine 110 have applied hotpatch binaries 115 to it. Local update service 107 has determined it is safe to apply the coldpatched binaries 114 to application 104 on disk. A second instance of application 104 is loaded and running, after the coldpatched binaries 114 were applied. In this scenario, the first instance of the application 104 is running with hotpatch binaries 115 and the second instance of application 104 is running with the coldpatched binaries 114. In these embodiments, the auditing service 108 analyzes the computer system 101a/101b on a per-process basis to determine if the computer system 101a/101b meets one or more compliance conditions within policies 109. Policies 109 may use additional attributes to determine risk of the two or more instances of application 104, for example, the coldpatched instance of application 104 was determined to less risky, and it was used by an administrator, that might make it more of a risk to computer system 101. However, if the hotpatch instance of application 104 might be more of a risk, but used by a guest user (with less privilege), it may be determined to be lower risk. There are many factors that may determine risk including what attacks the patched flaws are mitigating, user privilege, software dependencies, etc. In some embodiments, auditing service 108 will determine that the hotpatched instance of application 104 is too risky to continue to run. Auditing service 108 will either terminate that process, or signal OS Kernel 112 to terminate the process. In some embodiments, the local update service 107 maintains different versions of a software component within coldpatched binaries 114 (e.g. using different file paths), each supporting at different running instance/process of that software component at the computer system 101a/101b. In these embodiments, the local update service 107 may also maintain various hotpatches within hotpatch binaries 115 that are applicable to these different coldpatched binaries.

In some embodiments, determining the patching state also includes determining, based on the plurality of evidence, whether or not at least a subset of the one or more hotpatch binary files has been applied to a memory image into which an instance of the particular software component is loaded within system memory at the computer system. Continuing the ongoing example, in one scenario the patch state determination component 121 consults the patch log 111 to determine, for at least one running instance of application 104, whether or not one or more of the hotpatch binaries 115 have been applied to one of the coldpatched binaries 114, as applicable.

In some embodiments, determining the patching state also includes verifying whether or not hotpatches are indeed applied to the instance of the particular software component. Thus, some embodiments of act 202 comprises analyzing the memory image into which the instance of the particular software component is loaded to verify application of the subset of the one or more hotpatch binary files. Access to the memory may include taking a memory snapshot, collecting a live memory dump, implementing a kernel driver that reads the appropriate memory regions, etc. Continuing the ongoing example, the patch state determination component 121 passively monitors application 104 and/or OS 105 behavior to ensure the appropriate hotpatches are applied. In some embodiments, the patch state determination component 121 calls APIs, or produces appropriate input to various patched components to determine if they are patched appropriately.

As mentioned, in some embodiments one or more of the coldpatched binaries 114 and/or the hotpatch binaries 115 are associated with a digital signature. In these embodiments, the patch state determination component 121 may verify from the patch log 111 that a proper sequence of cold and hot patches has been applied based on these signatures (e.g., an audit trail). Thus, in some embodiments of act 202, determining the patching state of the particular software component also includes verifying, from the patch log, validity of a chain of two or more of corresponding digital signatures.

Method 200 also comprises an act 203 of, based on the patching state, enacting the compliance condition. In embodiments, act 201 includes, based on the particular system policy, and based on the determined patching state of the particular software component, enacting a compliance action for the particular compliance condition, the compliance action including at least one of (i) generating at least one of a health report or a health attestation, based at least on the patching state of the particular software component; (ii) initiating a patching action on the particular software component; or (iii) initiating an execution control action on the particular software component. Continuing the foregoing example, based on the compliance condition(s) identified by the policy identification component 120 in act 201, and based on the patching state of an instance of the application 104 determined in act 202, the compliance enforcement component 122 enacts a compliance action for the application 104.

In some embodiments, the compliance enforcement component 122 generates a health report based at least on the patching state of the particular software component. In embodiments, health report includes, or is based on, a variety of factors internal to the computer system 101a/101b, such as the security state of the underlying operating environment in which the particular software component executes (e.g., based on secure boot technologies, such as using a trusted platform module), which coldpatches and/or hotpatches have—or have not—been applied to the particular software component, a configuration state of the particular software component, and the like. Referring specifically to patching state, in some embodiments, generating the health report in act 203 comprises generating a health score based at least on having determined whether or not the subset of the one or more hotpatch binary files has been applied to the memory image into which the instance of the particular software component is loaded within the system memory.

In embodiments, a health report also includes, or is based on, information external to the computer system 101a/101b, such as information contained in the remote vulnerability database 118. For instance, whether or not an applied set of coldpatches and hotpatches address a vulnerability identified by the remote vulnerability database 118 can affect a health score. Thus, in some embodiments, generating the health report in act 203 comprises generating the health score based at least on whether or not the subset of the one or more hotpatch binary files address a vulnerability identified in an external vulnerability database. In some embodiments, the auditing service 108 communicates a generated health report to an external entity, such as a remote attestation service 117.

In some embodiments, the compliance enforcement component 122 generates a health attestation based at least on the patching state of the particular software component. Similar to a health report, in embodiments generation of a health attestation is based on variety of factors internal and/or external to the computer system 101a/101b. These factors can include the security state of the underlying operating environment in which the particular software component executes, which coldpatches and/or hotpatches have—or have not—been applied to the particular software component, a configuration state of the particular software component, whether or not an applied set of coldpatches and hotpatches address a vulnerability identified by the remote vulnerability database 118, and the like. In embodiments, compliance enforcement component 122 only generates a health attestation when a generated health score/report is sufficiently high (e.g., as per the identified compliance condition). For example, in some embodiments, generating the health attestation in act 203 comprises generating the health attestation only when the subset of the one or more hotpatch binary files has been applied to the memory image into which the instance of the particular software component is loaded within the system memory. In other embodiments, generating the health attestation in act 203 comprises generating the health attestation only when an operating system is determined to have an identified trust level.

In some embodiments, the compliance enforcement component 122 "degrades" a health score over time, even absent external input (e.g., new policies 109 from the remote update service 116, new vulnerability information from the remote vulnerability database 118, etc.). Thus, for example, even when a software component has already received a score sufficient for issuance of a health attestation by the compliance enforcement component 122, that software component may later receive a score insufficient for issuance of a continuing health attestation purely due to the passage of time (e.g., based on the age of policies 109). As will be appreciated by one of ordinary skill in the art, degrading a health score over time may be useful to ensure security in disconnected or partially connected scenarios, in which computer system 101a/101b operates with only intermittent or limited access to the remote update service 116. In particular, degrading a health score over time ensures that a computer system can only maintain compliance if it at least occasionally obtains patches from the remote update service 116.

In some embodiments, the compliance enforcement component 122 sends a generated health report and/or attestation to a compliance service. For example, in embodiments, computer system 101a/101b is in communication with a first- or third-party vulnerability assessment and/or compliance service that, for example, provides Compliance as a Service ("CaaS"). In these embodiments, this compliance service certifies the computer system 101a/101b for continued operation based, at least on part, on its patching status— including which hotpatches have been applied. In embodiments, the compliance service determines if the computer system 101a/101b can be certified by operation based at least on whether a combination of coldpatches and hotpatches applied the computer system 101a/101b address particular vulnerabilities identified in the remote vulnerability database 118. Thus, by sending the generated health report and/or attestation to the compliance service, the compliance service is enabled to certify the computer system 101a/101b for continued operation based, at least in part, on the hotpatches that are applied at that computer system 101a/101b. Referring to method 200, in some embodiments, generating the health report and/or the health attestation in act 203 therefore comprises sending the generated report or health attestation to a compliance service.

In some embodiments, the compliance enforcement component 122 initiates the patching action on the particular software component. For example, if the instance of the particular software component has not yet been patched with one or more of hotpatch binaries 115 as required by the particular compliance condition, but those hotpatch(es) are available, then the compliance enforcement component 122 instructs the hotpatch engine 110 to apply those hotpatch(es) to the instance of the particular software component. Thus, in some embodiments, initiating the patching action on the particular software component comprises initiating application of the subset of the one or more hotpatch binary files to the memory image into which the instance of the particular software component is loaded.

In another example, if the instance of the particular software component was not launched with one of the coldpatched binaries 114 as required by the particular compliance condition, but that coldpatch is available, then the compliance enforcement component 122 instructs the hotpatch engine 110 to relaunch the software component from the appropriate coldpatch. Thus, in some embodiments, initiating the patching action on the particular software component comprises initiating reloading of the instance of the particular software component from one of the one or more coldpatched binary files.

In yet another example, a coldpatch and/or hotpatch required by the particular compliance condition for the particular software component may not yet exist within the coldpatched binaries 114 and/or the hotpatch binaries 115. As a result, the compliance enforcement component 122 causes the local update service 107 to download those patch(es) from the remote update service 116. Thus, in some embodiments, initiating the patching action on the particular software component comprises scheduling downloading of one or more additional patch files for the particular software component.

In embodiments, a choice of which patching action(s) to make is based on the policies 109. Thus, in embodiments, particular patching action is selected based at least on part on the one or more system policies.

In some embodiments, the compliance enforcement component 122 initiates the execution control action on the particular software component. For example, if all coldpatches and/or hotpatches required by the particular compliance condition for the particular software component exist within the coldpatched binaries 114 and/or the hotpatch binaries 115, then the compliance enforcement component 122 permits launching a new instance of the particular software component by the loader 113. Thus, in some embodiments, initiating the execution control action on the particular software component comprises permitting loading of an additional instance of the particular software component. In these embodiments, the compliance enforcement component 122 further ensures that all required hotpatches are applied by the loader 113 during the launching. Thus, in embodiments, permitting the loading of the additional instance of the particular software component comprises enforcing application of the subset of the one or more hotpatch binary files to an additional memory image into which the additional instance of the particular software component is loaded.

In another example, if the coldpatched binaries 114 and/or the hotpatch binaries 115 lack all coldpatches and/or hotpatches required by the particular compliance condition for the particular software component, then the compliance enforcement component 122 denies launching a new instance of the particular software component by the loader 113. Thus, in some embodiments, initiating the execution control action on the particular software component comprises denying loading of the additional instance of the particular software component. Similarly, if the coldpatched binaries 114 and/or the hotpatch binaries 115 lack all coldpatches and/or hotpatches required by the particular compliance condition for the particular software component exist, then the compliance enforcement component 122 may terminate the already running instance of the particular software component. Thus, in some embodiments, initiating the execution control action on the particular software component comprises terminating the instance of the particular software component. As will be appreciated by one of ordinary skill in the art, this situation could arise if a new vulnerability is discovered and a patch is yet available.

In yet another example, there may exist one or more other software components that rely on the particular software component for operation (e.g., when the particular software component is a library), and the compliance enforcement component 122 only permits those other software component(s) to launch if all the coldpatches and hotpatches required by the particular compliance condition for the particular software component exist and/or are applied. Thus, in some embodiments, initiating the execution control action on the particular software component comprises permitting loading of another software component that depends on the instance of the particular software component. Similarly, if the coldpatches and hotpatches required by the particular compliance condition for the particular software component no not exist and/or are not applied, then the compliance enforcement component 122 may deny launching of those other software component(s). Thus, in some embodiments, initiating the execution control action on the particular software component comprises denying loading of the other software component that depends on the instance of the particular software component.

In yet another example, if the coldpatched binaries 114 and/or the hotpatch binaries 115 lack all coldpatches and/or hotpatches required by the particular compliance condition for the particular software component, then the compliance enforcement component 122 allows launching of a new instance of the particular software component by the loader 113, enforces that new instance to run within a sandboxed environment (e.g., a container, a virtual machine, a jail, etc.). Thus, in some embodiments, initiating the execution control action on the particular software component comprises sandboxing the additional instance of the particular software component.

In some embodiments, method 200 is performed by an audit service residing in the same memory space as an operating system under which it operates. For example, in reference to FIG. 1A, the auditing service 108 resides within a same memory region as OS 105. In other embodiments, method 200 is performed by an audit service residing a memory space that is protected from an operating system under which it operates. For example, in reference to FIG. 1B, the auditing service 108 resides within a protected memory region, while OS 105 resides in a separate OS memory region. In this latter embodiment, method 200 is therefore performed, at least in part, by a component residing in a protected memory region. In some embodiments, the protected memory region is isolated with hardware (e.g. Intel Software Guard Extensions (SGX), ARM TrustZone, etc.). In some embodiments, the protected memory is isolated by a hypervisor from another memory region in which the particular software component resides.

While this disclosure has focused on software patches, it will be appreciated the that principles discussed herein are also applicable to hardware updates/upgrades. For example, in embodiments, the auditing service 108 considers hardware configuration information for the computer system 101a/101b when making health reports/attestations, including considering hardware that has been added to the computer system 101a/101b since boot, hardware that has been removed from the computer system 101a/101b since boot, hardware that has been hot swapped into the computer system 101a/101b since boot, hardware firmware updates, etc. Thus, for example, the auditing service 108 may deny a compliance certification if firmware gets out of date or becomes vulnerable, if hardware becomes obsolete or is deemed vulnerable or unstable, if unknown hardware is added, if required hardware is removed, etc.

Accordingly, the embodiments described herein evaluate and enforce system health compliance based on a mix of coldpatches and hotpatches that are available and/or active at a computer system. These embodiments leverage one or more policies to determine compliance conditions for one or more software components, determining health state for these more software component(s) based at least on which coldpatches and which hotpatches are applied to running instances of these software component(s), and enacting one or more compliance actions for the compliance conditions, such as generating a health report and/or health attestation for these software component(s), initiating patching action for these software component(s), initiating an execution control action for these software component(s), and the like.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, Resistive RAM, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), Infrastructure as a Service ("IaaS"), CaaS, and the like. The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. The terms "set" and "subset" are indented to exclude an empty set, and thus "set" and is defined as a non-empty set, and "subset" is defined as a non-empty subset.

What is claimed:
1. A method, implemented at a computer system that includes a processor, for enacting compliance actions using an assessment that considers a mix of coldpatches and hotpatches, the method comprising:
    identifying one or more system policies that define one or more compliance conditions based on patching status of software components, including identifying a particular system policy that defines a set of compliance conditions for a particular software component that includes:
        a first compliance condition defining that, when a goal for the computer system is a security goal, installation of a particular coldpatched binary for the particular software component is required to maintain compliance, and
        a second compliance condition defining that, when the goal for the computer system is an availability goal, installation of a particular hotpatch binary for the particular software component is sufficient to maintain compliance, the particular hotpatch binary lacking a fix present in the particular coldpatched binary;
    determining a patching state of the particular software component, including:
        identifying a plurality of evidence, each corresponding to a binary file of a plurality of binary files that has been applied to the particular software component, the plurality of binary files including (i) one or more coldpatched binary files from which the particular software component is loadable, and (ii) one or more hotpatch binary files applicable to the particular software component; and
        determining, based on the plurality of evidence, at least one of:
            that the goal for the computer system is the security goal, and an instance of the particular software component is not loaded from the particular coldpatched binary; or
            that the goal for the computer system is the availability goal, and the particular hotpatch binary has not been applied to a memory image into which the instance of the particular software component is loaded;
    based on the particular system policy, and based on the determined patching state of the particular software component, enacting a compliance action for one of the first compliance condition or the second compliance condition, the compliance action including at least one of:

generating at least one of a health report or a health attestation, based at least on the patching state of the particular software component;

initiating a patching action on the particular software component; or initiating an execution control action on the particular software component.

2. The method of claim 1, wherein the method generates the health report based at least on the patching state of the particular software component, and wherein generating the health report comprises at least one of:

generating a health score based at least on having determined that the goal for the computer system is the security goal, and an instance of the particular software component is loaded from the particular coldpatched binary; or generating the health score based on having determined that the goal for the computer system is the availability goal, and the particular hotpatch binary has been applied to a memory image into which the instance of the particular software component is loaded.

3. The method of claim 1, wherein the method generates the health attestation based at least on the patching state of the particular software component, and wherein generating the health attestation comprises generating the health attestation only when an operating system is determined to have an identified trust level.

4. The method of claim 1, wherein the method generates at least one of the health report or the health attestation, and wherein the method further comprises sending the generated report or health attestation to a compliance service.

5. The method of claim 1, wherein the method initiates the patching action on the particular software component, and wherein initiating the patching action on the particular software component comprises at least one of:

initiating application of the particular hotpatch binary to the memory image into which the instance of the particular software component is loaded;

initiating reloading of the instance of the particular software component from the particular coldpatched binary; or scheduling downloading of one or more additional patch files for the particular software component.

6. The method of claim 5, wherein a particular patching action is selected based at least on part on the one or more system policies.

7. The method of claim 1, wherein the method initiates the execution control action on the particular software component, wherein initiating the execution control action on the particular software component comprises at least one of:

permitting loading of an additional instance of the particular software component;

denying loading of the additional instance of the particular software component;

permitting loading of an other software component that depends on the instance of the particular software component;

denying loading of the other software component that depends on the instance of the particular software component;

terminating the instance of the particular software component; or sandboxing the additional instance of the particular software component.

8. The method of claim 7, wherein permitting the loading of the additional instance of the particular software component comprises enforcing application of the particular hotpatch binary to an additional memory image into which the additional instance of the particular software component is loaded.

9. The method of claim 1, wherein determining the patching state of the particular software component also includes analyzing the memory image into which the instance of the particular software component is loaded to verify application of the particular hotpatch binary.

10. The method of claim 1, wherein each of the one or more coldpatched binary files and the one or more hotpatch binary files are associated with a corresponding digital signature, and wherein determining the patching state of the particular software component also includes verifying, from a patch log, validity of a chain of two or more of corresponding digital signatures.

11. The method of claim 1, wherein the method is performed, at least in part, by a component residing in a protected memory region that is isolated from another memory region in which the particular software component resides.

12. The method of claim 1, wherein at least one of the one or more system policies is received or encoded within a patch file.

13. The method of claim 1, wherein the particular system policy comprises at least one of a health policy or a functionality policy.

14. A computer system for enacting compliance actions using an assessment that considers a mix of coldpatches and hotpatches, comprising:

a processor; and a hardware storage device that stores computer-executable instructions that are executable by the processor to at least:

identify one or more system policies that define one or more compliance conditions based on patching status of software components, including identifying a particular system policy that defines a set of compliance conditions for a particular software component that includes:

a first compliance condition defining that, when a goal for the computer system is a security goal, installation of a particular coldpatched binary for the particular software component is required to maintain compliance, and a second compliance condition defining that, when the goal for the computer system is an availability goal, installation of a particular hotpatch binary for the particular software component is sufficient to maintain compliance, the particular hotpatch binary lacking a fix present in the particular coldpatched binary;

determine a patching state of the particular software component, including:

identifying a plurality of evidence, each corresponding to a binary file of a plurality of binary files that has been applied to the particular software component, the plurality of binary files including (i) one or more coldpatched binary files from which the particular software component is loadable, and (ii) one or more hotpatch binary files applicable to the particular software component; and determining, based on the plurality of evidence, at least one of:

that the goal for the computer system is the security goal, and an instance of the particular software component is not loaded from the particular coldpatched binary; or that the goal for the computer system is the availability goal, and the particular hotpatch binary has not been applied to a memory image into which the instance of the particular software component is loaded;

based on the particular system policy, and based on the determined patching state of the particular software component, enact a compliance action for one of the first compliance condition or the second compliance condition, the compliance action including at least one of:

generating at least one of a health report or a health attestation, based at least on the patching state of the particular software component;

initiating a patching action on the particular software component; or initiating an execution control action on the particular software component.

15. The computer system of claim 14, wherein the computer system generates the health report based at least on the patching state of the particular software component, and wherein generating the health report comprises at least one of:

generating a health score based at least on having determined that the goal for the computer system is the security goal, and an instance of the particular software component is loaded from the particular coldpatched binary; or generating the health score based on having determined that the goal for the computer system is the availability goal, and the particular hotpatch binary has been applied to a memory image into which the instance of the particular software component is loaded.

16. The computer system of claim 14, wherein the computer system generates the health attestation based at least on the patching state of the particular software component, and wherein generating the health attestation comprises generating the health attestation only when an operating system is determined to have an identified trust level.

17. The computer system of claim 14, wherein the computer system initiates the patching action on the particular software component, and wherein initiating the patching action on the particular software component comprises at least one of:

initiating application of the particular hotpatch binary to the memory image into which the instance of the particular software component is loaded;

initiating reloading of the instance of the particular software component from the particular coldpatched binary; or scheduling downloading of one or more additional patch files for the particular software component.

18. The computer system of claim 14, wherein the computer system initiates the execution control action on the particular software component, and wherein initiating the execution control action on the instance of the particular software component comprises at least one of:

permitting loading of an additional instance of the particular software component;

denying loading of the additional instance of the particular software component;

permitting loading of an other software component that depends on the instance of the particular software component;

denying loading of the other software component that depends on the instance of the particular software component;

terminating the instance of the particular software component; or sandboxing the additional instance of the particular software component.

19. The computer system of claim 14, wherein each of the one or more coldpatched binary files and the one or more hotpatch binary files are associated with a corresponding digital signature, and wherein determining the patching state of the particular software component also includes verifying, from a patch log, validity of a chain of two or more of corresponding digital signatures.

20. A computer program product comprising a hardware storage device that stores computer-executable instructions that are executable by a processor to cause a computer system to enact compliance actions using an assessment that considers a mix of coldpatches and hotpatches, the computer-executable instructions including instructions that are executable by the processor to cause the computer system to at least:

identify one or more system policies that define one or more compliance conditions based on patching status of software components, including identifying a particular system policy that defines a set of compliance conditions for a particular software component that includes:

a first compliance condition defining that, when a goal for the computer system is a security goal, installation of a particular coldpatched binary for the particular software component is required to maintain compliance, and a second compliance condition defining that, when the goal for the computer system is an availability goal, installation of a particular hotpatch binary for the particular software component is sufficient to maintain compliance, the particular hotpatch binary lacking a fix present in the particular coldpatched binary;

determine a patching state of the particular software component, including:

identifying a plurality of evidence, each corresponding to a binary file of a plurality of binary files that has been applied to the particular software component, the plurality of binary files including (i) one or more coldpatched binary files from which the particular software component is loadable, and (ii) one or more hotpatch binary files applicable to the particular software component; and determining, based on the plurality of evidence, at least one of:

that the goal for the computer system is the security goal, and an instance of the particular software component is not loaded from the particular coldpatched binary; or that the goal for the computer system is the availability goal, and the particular hotpatch binary has not been applied to a memory image into which the instance of the particular software component is loaded;

based on the particular system policy, and based on the determined patching state of the particular software component, enact a compliance action for one of the first compliance condition or the second compliance condition, the compliance action including at least one of:

generating at least one of a health report or a health attestation, based at least on the patching state of the particular software component;

initiating a patching action on the particular software component; or initiating an execution control action on the particular software component.

* * * * *